United States Patent
Morgan (10) Patent No.: US 10,744,680 B2
(45) Date of Patent: Aug. 18, 2020

(54) SYSTEM AND METHOD FOR RECYCLING AND RECAPTURE OF BIO-BASED PLASTICS

(71) Applicant: Plastipak Packaging, Inc., Plymouth, MI (US)

(72) Inventor: Edward V. Morgan, Northville, MI (US)

(73) Assignee: Plastipak Packaging, Inc., Plymouth, MI (US)

(*) Notice: Subject to any disclaimer, the term of this patent is extended or adjusted under 35 U.S.C. 154(b) by 0 days.

(21) Appl. No.: 15/166,017

(22) Filed: May 26, 2016

(65) Prior Publication Data

US 2016/0271838 A1    Sep. 22, 2016

Related U.S. Application Data (62) Division of application No. 13/796,481, filed on Mar. 12, 2013, now Pat. No. 9,353,237.
(Continued)

(51) Int. Cl.
*B29B 17/02* (2006.01)
*C08J 11/04* (2006.01)
(Continued)

(52) U.S. Cl.
CPC ............... *B29B 17/02* (2013.01); *C08J 11/04* (2013.01); *B29B 2017/0203* (2013.01);
(Continued)

(58) Field of Classification Search
CPC .... C08J 11/04; C08J 2300/30; C08J 2367/02; B29B 17/02; B29B 2017/0203;
(Continued)

(56) References Cited

U.S. PATENT DOCUMENTS 5,201,921 A    4/1993    Luttermann et al.
8,574,384 B1   11/2013   Lee
(Continued)

FOREIGN PATENT DOCUMENTS

WO    9708537          3/1997
WO    2007071702 A1    6/2007
(Continued)

OTHER PUBLICATIONS

Sawyer, Dan. New Avenues in Recycling: NIR and Other Technologies Sort PET and Bioresin Bottles. Natureworks LLC. Feb. 23, 2009 [retrieved on Mar. 5, 2014].

*Primary Examiner* — Frances Tischler
(74) *Attorney, Agent, or Firm* — Fishman Stewart PLLC (57) ABSTRACT

A method for reclaiming bio-based plastic material is disclosed, including providing a bio-based plastic article, the article including an identifier, determining article content information from or via the identifier, and recycling the article based on article content information. Further, a system for reclaiming bio-based plastic material is disclosed, including an apparatus or device configured to obtain or determine a bio-based material content associated with a plastic article, and an apparatus or device configured to sort the plastic article based upon the bio-based material content of the plastic article. A bio-based plastic article comprising recycled bio-based material is also disclosed.

23 Claims, 5 Drawing Sheets

Related U.S. Application Data

(60) Provisional application No. 61/751,488, filed on Jan. 11, 2013.

(51) Int. Cl.
*B29K 23/00* (2006.01)
*B29K 67/00* (2006.01)

(52) U.S. Cl.
CPC ... *B29B 2017/0279* (2013.01); *B29K 2023/06* (2013.01); *B29K 2023/12* (2013.01); *B29K 2067/003* (2013.01); *B29K 2995/006* (2013.01); *C08J 2300/30* (2013.01); *C08J 2367/02* (2013.01); *Y02P 20/143* (2015.11); *Y02W 30/622* (2015.05); *Y02W 30/70* (2015.05); *Y10T 428/1352* (2015.01)

(58) Field of Classification Search
CPC ........ B29B 2017/0279; B29K 2023/06; B29K 2023/12; B29K 2067/003; B29K 2995/006; Y02P 20/143; Y02W 30/622; Y02W 30/70; Y10T 428/1352
See application file for complete search history.

(56) References Cited

U.S. PATENT DOCUMENTS

| | | |
|---|---|---|
| 2009/0246430 A1 | 10/2009 | Kriegel et al. |
| 2010/0028512 A1 | 2/2010 | Kriegel et al. |
| 2013/0140320 A1 | 6/2013 | Nadella et al. |

FOREIGN PATENT DOCUMENTS

| | | |
|---|---|---|
| WO | 2010101698 A2 | 9/2010 |
| WO | 2012024502 A1 | 2/2012 |

SYSTEM AND METHOD FOR RECYCLING AND RECAPTURE OF BIO-BASED PLASTICS

CROSS-REFERENCE TO RELATED APPLICATIONS

This application is a divisional of pending U.S. patent application Ser. No. 13/796,481, filed Mar. 12, 2013, which application claims the benefit of priority to U.S. Provisional Application No. 61/751,488, filed Jan. 11, 2013, the entire disclosures of which are incorporated herein by reference.

TECHNICAL FIELD

The present invention relates to a system and method for recycling and recapture of bio-based plastics, articles processed through such a system and method, and article produced from such system and method.

BACKGROUND

Plastics, such as PET, PE, and PP, are commonly used in connection with the manufacture of packaging articles, such as bottles and containers. However, as used herein, "article" shall not be limited to packaging articles. The term "PET" refers to polyethylene terephthalate, and may include its copolymers and combinations. The term "PE" refers to polyethylene, and may include high density polyethylene ("HDPE"), low density polyethylene ("LDPE"), and its copolymers and combinations. The term "PP" refers to polypropylene, and may include its copolymers and combinations. Plastic material, such as PET, can be provided in a number of forms, including flakes and pellets.

PET that is comprised of petrochemical-derived raw materials, or petroleum-based PET, is commonly used to manufacture a number of commercial articles. The cost of petroleum-based PET is, however, closely related to the cost of petroleum. Moreover, as petrochemicals take hundreds of thousands of years to form naturally, petrochemical-derived products are considered to be non-renewable.

Methods for making bio-based plastics, such as bio-based PET packaging, have been disclosed in the art. The term "bio-based" generally refers to the biogenic carbon content of an article, which can be represented as a fraction weight (mass) or percent weight (mass) of the total organic carbon in the article per the ASTM D6866 standard. This standard method can be used to determine precise percentages of a solid, liquid, or gas that came from renewable sources by measuring the material's carbon-14 ($C^{14}$) content. Since $C^{14}$ decays at a predictable rate over time (having an approximately 5,000 year half-life) and becomes stable $C^{12}$ isotope, fossil fuels generally do not contain $C^{14}$ content due to their age. Thus, the presence of $C^{14}$ versus $C^{12}$ in a material can be used to signify/quantify bio-based carbon content. The term "bio-based" can be used to indicate the inclusion of a component that is fully or partially derived from at least one bio-based material, i.e., an organic material in which the associated carbon comes from non-fossil biological sources.

Consumer demand for bio-based plastics, including but not limited to PET, has been on the rise, increasing the need for more productive and efficient means of meeting such demand. Further, many governments, corporations and other organizations have given high priority to developing, finding, subsidizing and using more bio-based products, including plastics. For example, and without limitation, the United States Department of Agriculture has a BioPreferred program that steers contractors towards using more bio-based materials. Average consumers are also becoming more aware of and predisposed to purchasing bio-based products. The sophistication has grown to the point where consumers may, prior to making a purchase, inquire as to the actual bio-based content percentage, recycled content percentage, and/or material types and sources.

For plastic articles, such as containers, including those made from PET, an object can be to economically maximize the bio-based content of the article. Some conventional articles include up to about 30% bio-based content. However, conventional PET containers are not more than one-half bio-based, and commercially available PET containers are not 100% bio-based. Conventional containers with a portion of bio-based content, such as those marketed under the PLANT BOTTLE™ trademark, may employ PET resin having one building block derived from petroleum, and another building block derived from bio-based sources. Specifically, the main components in manufacturing PET via polymerization include terephthalic acid/ester (TA) and ethylene glycol (EG). While the ratios may vary slightly, a typical PET manufacturing process might use about 68.75% TA and about 31.25% EG on a mass basis. Terephthalic acid has eight carbon atoms per molecule, while ethylene glycol has two. The resulting molecule of PET may include 10 total carbon atoms derived from a combination of TA and EG.

Certain bio-based feedstock, including but not limited to sugar cane, sugar beets, or other forms of natural sugar, can be used to produce bio-based EG. The typical process includes converting the feedstock (e.g., via hydro-cracking) into ethylene, adding oxygen to form ethylene oxide, and then adding water to form EG. This process for bio-based EG is similar to that of petrol-based EG, differing primarily in the choice of feedstock and process for converting the feedstock into ethylene. Although generally more expensive and less plentiful than petrol-based EG, bio-based EG is commercially available and is used in some conventional PET resins, for example, those marketed under the PLANT BOTTLE™ name. These resins are said to reach up to 30% bio-based content, derived solely from the bio-based EG component.

A conventional petrol-based process for manufacturing terephthalic acid comprises refining naphtha from crude oil and reforming to paraxylene (pX). The paraxylene is mixed with a solvent (typically acetic acid), catalyst, and promoter and oxidized into crude TA, which may be further refined into purified TA (PTA). Some methods for manufacturing bio-based TA, including those described in U.S. patent application Ser. No. 12/577,480 (Patent Publication No. 2010/0028512), have been proposed.

Further, and without limitation, bio-based polyethylene may be manufactured from 100% bio-based feedstock. A currently available process comprises processing sugar cane or any other form of natural sugar (such as sucrose), fermenting and distilling into ethanol, dehydrating to form ethylene, and then polymerizing to form polyethylene. Such a process can be employed in connection with multiple forms of polyethylene including, without limitation, high density polyethylene (HDPE), linear low density polyethylene (LLDPE), among others. A process associated with forming polypropylene (PP) may be very similar to that associated with forming polyethylene. After forming ethylene, though, the ethylene can be converted to propylene via a dimerization or metathesis process. The propylene monomer may then be converted to polypropylene.

In the pursuit of more eco-friendly packaging, bio-based products, including plastics, are gaining acceptance as potential alternatives to petrol-based products. While certain bio-based plastic materials are known, and may be currently sold in the market, a challenge has been to create an effective means for identifying and recapturing such material in a recycling system.

SUMMARY

A method for reclaiming bio-based plastic material is disclosed, including providing a bio-based plastic article, the article including an identifier, determining article content information from or via the identifier, and recycling the article based on article content information. Further, a system for reclaiming bio-based plastic material is disclosed, including an apparatus or device configured to obtain or determine a bio-based material content associated with a plastic article, and an apparatus or device configured to sort the plastic article based upon the bio-based material content of the plastic article. A bio-based plastic article comprising recycled bio-based material is also disclosed.

BRIEF DESCRIPTION OF THE DRAWINGS

Embodiments of the disclosure will now be described, by way of example, with reference to the accompanying drawings, wherein.

DETAILED DESCRIPTION

Reference will now be made in detail to embodiments of the present disclosure, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1A:
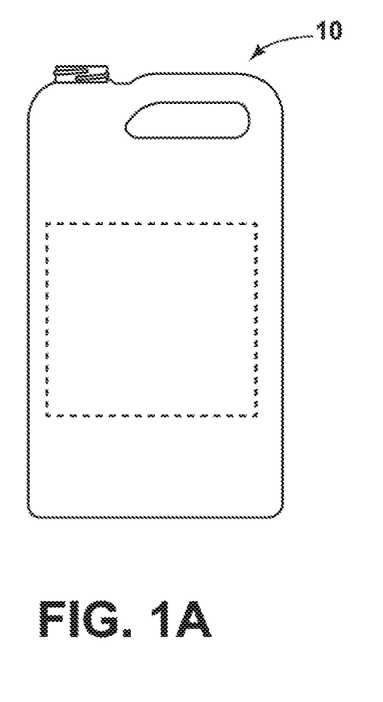
FIG. 1A is a side elevation view of an embodiment of an article, more specifically a plastic container, including a bio-based identifier.
Figure 1B:
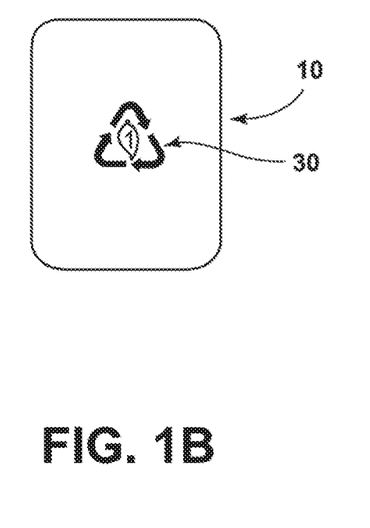
FIG. 1B is a bottom view of the article as shown in FIG. 1A, more specifically a plastic container (base view), including a bio-based identifier.
Figure 2A:
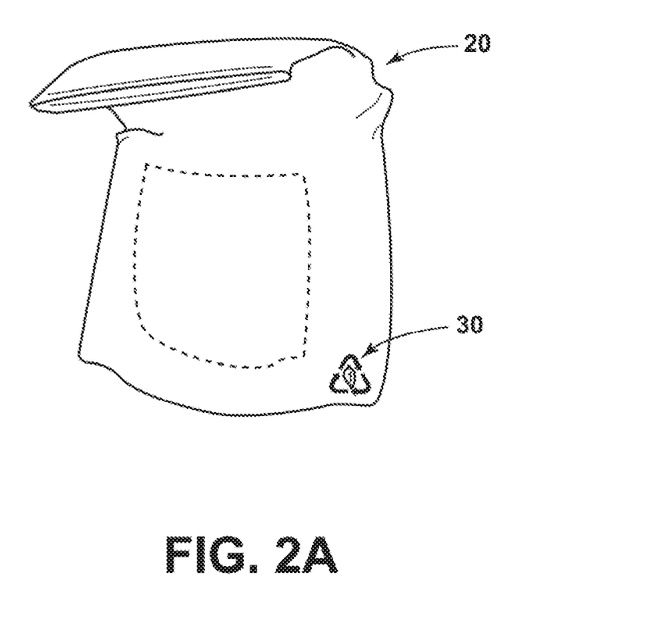
FIG. 2A is a depiction of an embodiment of an article, more specifically a plastic package, including a bio-based identifier.
Figure 2B:
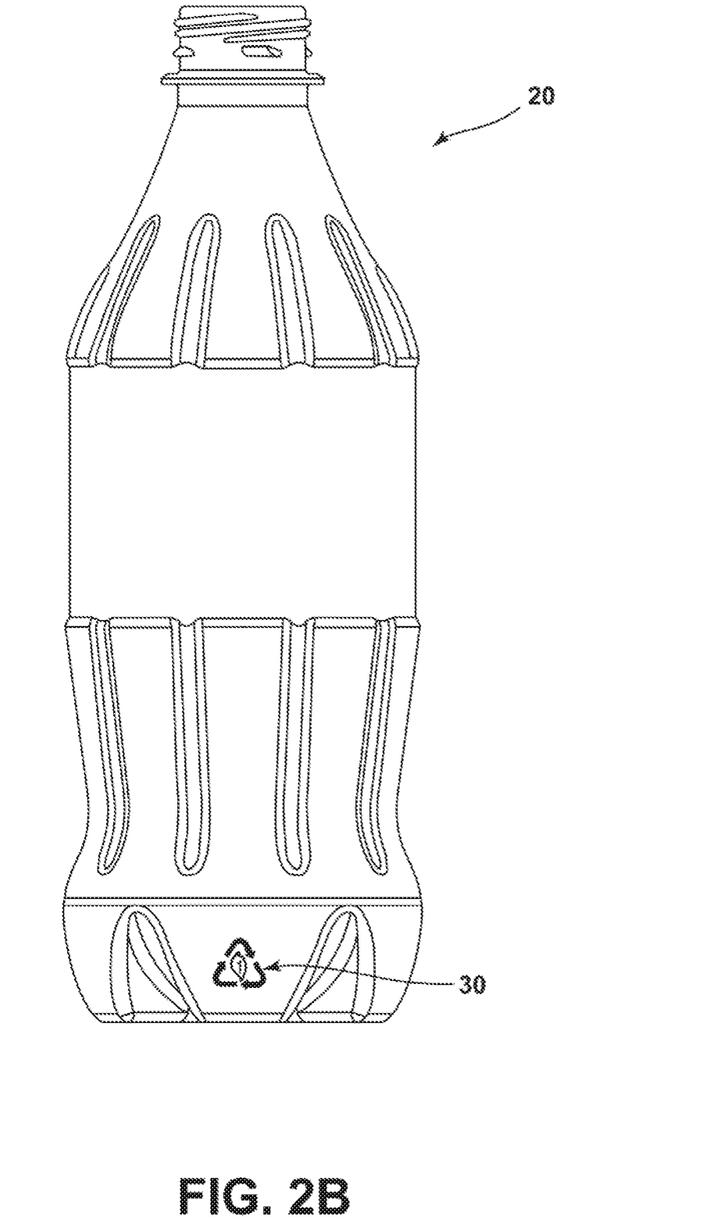
FIG. 2B is a depiction of an embodiment of another article, more specifically, a plastic bottle, including a bio-based identifier.

FIGS. 1A, 2A, and 2B generally illustrate embodiments of articles 10, 20, and 22, respectively. Such articles may, as generally illustrated, comprise a plastic container (see, e.g., bottle generally illustrated in FIG. 2B) or plastic package (see, e.g., package generally illustrated in FIG. 2A) that include a bio-based identifier 30, such as disclosed herein.

Figure 3A:
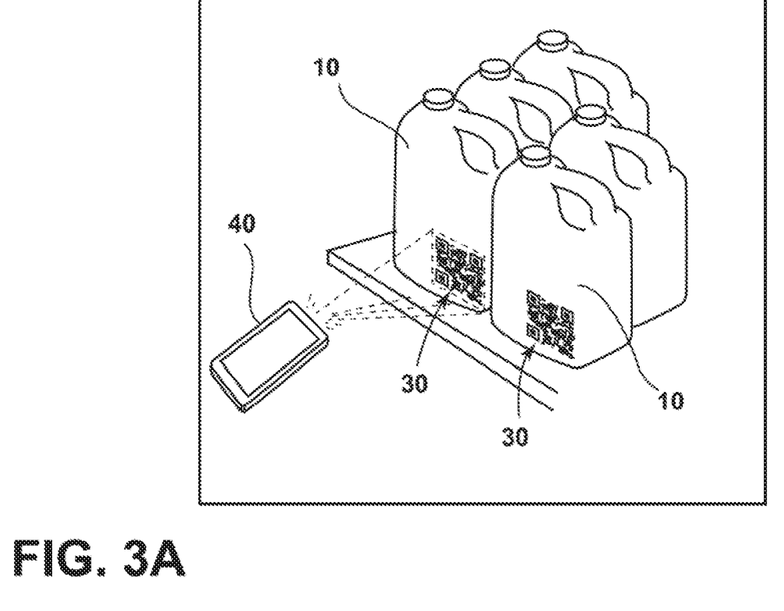
FIG. 3A is a graphical representation of an embodiment of a system and apparatus for use in identifying a bio-based identifier on an article.
Figure 3B:
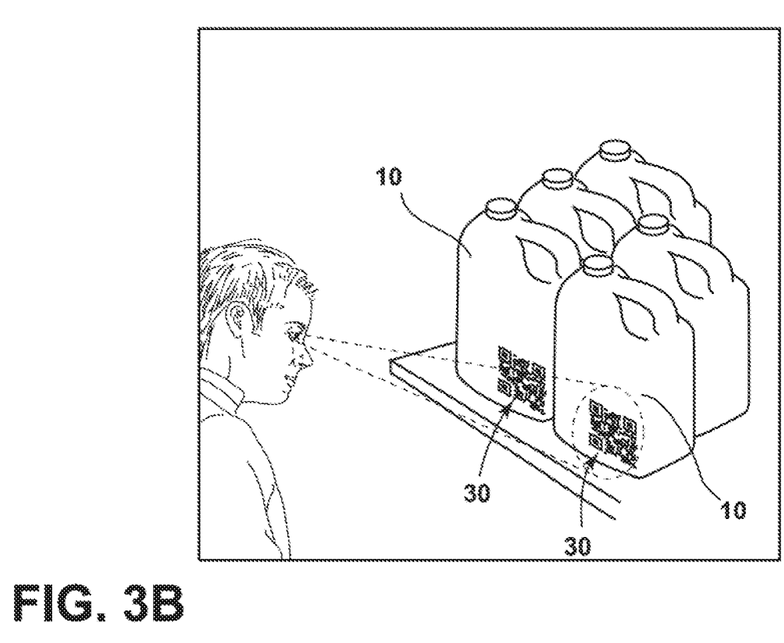
FIG. 3B is graphical representation of another embodiment of a system and apparatus for use in identifying a bio-based identifier on an article.

FIGS. 3A and 3B generally illustrate embodiments of systems that may be used in connection with the disclosure. As generally depicted in FIG. 3A, a device 40 may be used to acquire and/or identify an identifier 30 from an article 10. The device may comprise, without limitation, a permanent or a portable electronic device that is capable of scanning, reading, or otherwise acquiring or identifying an identifier (such as further described herein). Examples such devices include, without limitation, machine vision apparatus, handheld scanning devices, and smart phones. Additionally, as generally shown in FIG. 3A, a user may visually identify a given identifier associated with an article 10.

In a method for identifying and reclaiming bio-based plastic material, an identifier can be included with, part of, or incorporated into the material or article. In an embodiment, a bio-based plastic resin may include an "identifier," for example, one or more additives, that can aid in distinguishing such containers from petrol-based containers. The inclusion of one or more identifiers can aid in the recycling process, and can be included in a manner that does not compromise or adversely effect intended commercial sale or use.

For example, without limitation, a colorant or dye (e.g., an ultra-violet dye) may be included in the resin master batch at a small percentage or let-down ratio. The resin master batch can then be used in connection with the production of plastic containers. The identifier(s) can be comprised or configured such that the identifier(s) is unobtrusive and, if desired, may not be generally visible/perceptible to the human eye absent special equipment.

Figure 4A:
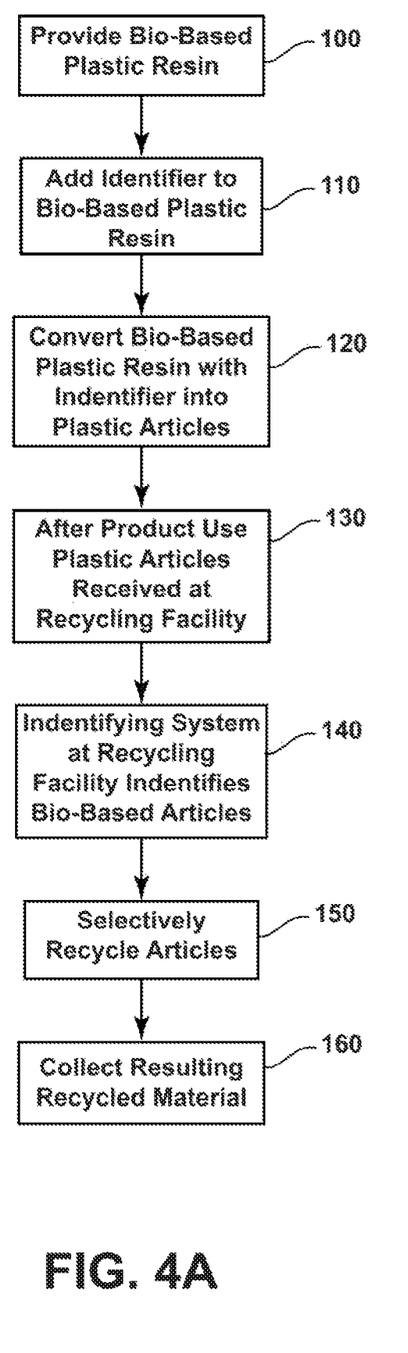
FIG. 4A is a flow chart generally illustrating an embodiment of a process for identifying and recycling bio-based articles.
Figure 4B:
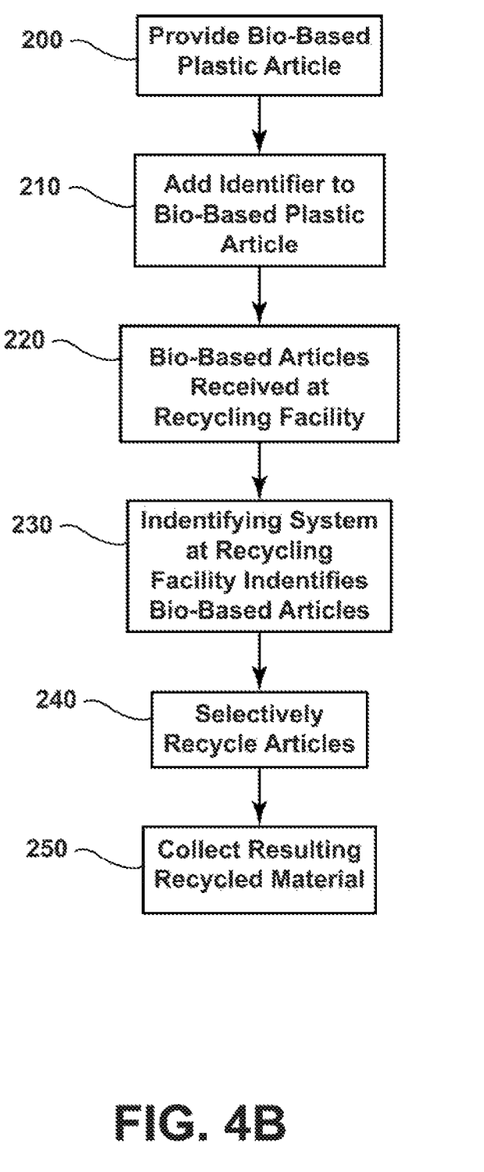
FIG. 4B is a flow chart generally illustrating another embodiment of a process for identifying and recycling bio-based articles.
Figure 4C:
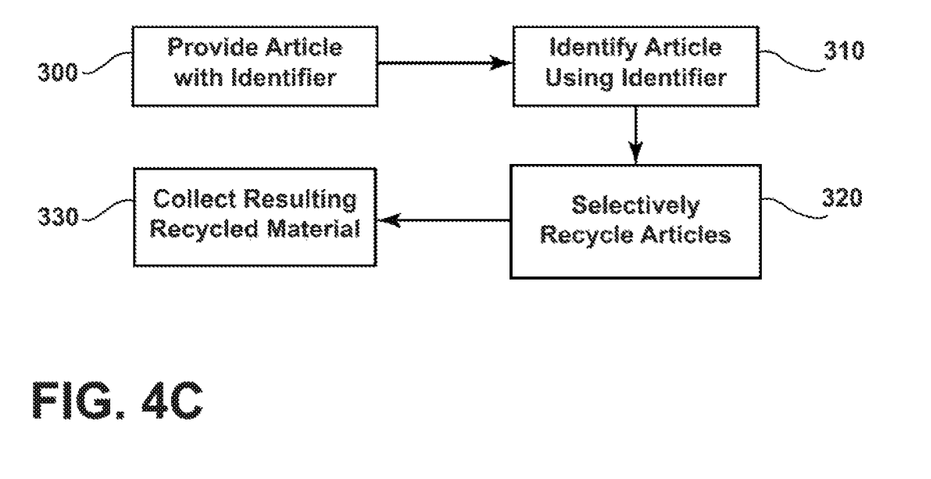
FIG. 4C is a flow chart generally illustrating yet another embodiment of a process of identifying and recycling bio-based articles.

FIGS. 4A, 4B, and 4C generally illustrate embodiments of a process for identifying and recycling bio-based articles.

With the embodiment of the process outlined in FIG. 4A, a resin for a bio-based article (such as a container or package) is provided (step 100). An identifier is added to the resin (step 110). The resin is then converted or otherwise processed to form an article, such as a container or package (step 120). After the article (e.g., product) has been used (e.g., commercially), the product/article is received at a recycling location or facility (step 130). An identification device or system (which could involve a user's visual identification) can then be used to identify bio-based articles (e.g., articles meeting some bio-based criteria) (step 140). The process can then selectively recycle articles that meet a criteria (such as bio-based articles or certain select types of bio-based articles) (step 150). The recycling can then result in the provision or collection of recycled material, for example and without limitation, recycled material that is bio-based (step 160).

With the embodiment of the process outlined in FIG. 4B, a bio-based article is provided (step 200). An identifier is added to the article (step 210). The article is provided or otherwise received at a recycling location or facility (step 220). An identification device or system (which could involve a user's visual identification) can then be used to identify bio-based articles (e.g., articles meeting some bio-based criteria) (step 230). The process can then selectively recycle articles that meet a criteria (such as bio-based articles or certain select types of bio-based articles) (step 240). The recycling can then result in the provision or collection of recycled material, for example and without limitation, recycled material that is bio-based (step 250).

In accordance with some embodiments of the disclosure, a custom blend of PCR material that includes bio-based content can be provided. Such custom blend(s) with bio-based content may be based upon the bio-based content of the associated feedstock or input into the process (e.g., bales of post-consumer materials) along with the identification process utilized. The custom blend may optionally include both bio-based and petrol-based materials at ratios that may be specified or optionally selected by the processor.

With the embodiment of the process outlined in FIG. 4C, a bio-based article is provided (step 300). The article is identified using an identifier associated with the article (step 310). The identification may be accomplished, for example and without limitation, via a device or system (which could involve a user's visual identification) and may identify bio-based articles (e.g., articles meeting some bio-based criteria). The process can then selectively recycle articles that meet a criteria (such as bio-based articles or certain select types of bio-based articles) (step 320). The recycling can then result in the provision or collection of recycled material, for example and without limitation, recycled material that is bio-based (step 250). In an embodiment, when containers with an identifier are received and processed for recycling (e.g., at a recycling facility), appropriate equipment, which may include, without limitation, scanners, infrared sensors, or cameras, may be used to identify containers that have an identifier (e.g., colorant or dye). In an embodiment, a colorant or dye can be included that is only visible via infrared detection. Additionally, with embodiments, various individual/specific identifiers (e.g., colorants or dyes) may be distinguishable from each other. For example and without limitation, different identifiers may be used to aid in the separation of bio-based containers that are 30% bio-based from other containers that, for instance, are 100% bio-based, or may be used to separate containers that are bio-based from those that are petrol-based containers.

With other embodiments, the identifier used with bio-based resins (and articles produced therefrom) may include a chemical tracer(s) that are added to or included with a bio-based resin. During the production of a plastic resin, such as PET or PE, the manufacturer may include certain "tracers" that serve to distinguish resin produced by the manufacturer from similar resins produced by others. These tracers may be compounds (such as organic chemical(s)) added at minute levels, e.g., in the single parts per billion or less range. The tracer is preferably a compound not normally present from the standard polymerization process, but, at such small levels, the tracer will not negatively or adversely affect the resulting polymer's suitability with respect to recyclability or functionality. The tracers may be optionally added during the melt polymerization phase or the solid state polymerization stage. Using a tracer, molecular and/or chemical testing of resin batches could be used to determine the origin, identity or provenance. While not required, tracers may optionally be include in embodiments to identify bio-based articles and selectively recover them within a recycling process.

In embodiments, bio-based resins (and articles produced therefrom) may include the inclusion or placement of a distinguishing/visible mark on the article (such as a container) that designates the article as "bio-based." There are current industry accepted standard marking practices for recyclability that are based on the plastic content of an article. For example, a PET container marked with a "1," is suitable for a PET recycling process. Some extruded PET copolymers, while including PET, are marked with a "7" or "Other," may not be suitable for recycling with a standard PET process. HDPE containers marked with a "2" are suitable for a HDPE recycling process, while PP containers marked with a "5" are suitable for a PP recycling process.

The disclosed system can utilize separate or additional marking to distinguish bio-based articles and, if desired, create a separate recycling stream through a new code, and/or use an existing stream, while allowing the recycling facility to better identify and control the bio-based content in the PCR resin that it handles or produces. For example, in an embodiment, a designation/mark such as "BIO" or "B" may be included with or in place of a recycling number. For instance, a bio-based PET container can be marked as "1-B" or "1-BIO" or the like. A symbol (e.g., a leaf) could also be used. Such markings and/or symbols can be configured to be visible throughout the commercial life of the product, and can add to the marketability of the product. A recycling facility can then use a means for reading the identifier, including but not limited to a recycle code, such as scanner, vision system, sorting means, human eyesight, or others.

In one embodiment, the identifier may comprise a marker, which may include without limitation one or more UV dyes, colorants, chemical traces, organic additives, tints, others, or a mixture thereof. As used herein, a "marker" is a compound that may be added, at optional let-down ratios, to the resin at the production site, be it a blow molding, injection molding, extrusion molding, or other operation. The marker may give a distinctive visual cue to a person and/or vision system employed at a recycling center, thereby readily conveying bio-based content information. Further, the marker may give added benefits, including without limitation reduction of article haze, added clarity, barrier properties, material scavenging, and more.

For purposes of this disclosure, the term "identifier" refers to an element, of structural or physical nature, of an article that is configured to disclose information regarding the bio-based content of said article to a recycling process, system, method or user. An identifier may comprise a feature of or be associated with an embodiment disclosed herein, but it is not intended to be limited to such.

Another aspect of the disclosure involves the manufacture of bio-based plastic containers that incorporate at least a portion of recycled bio-based material. Such recycled content can come from post-consumer (PCR) or post-industrial (PIR) sources. For the purposes of this disclosure, "PCR" will be used to generally refer to recycled plastics, regardless of the source. Embodiments envision the use of a means for identifying, segregating, and collecting bio-based plastic containers after the containers have entered the commercial market to make the collection of bio-based PCR resins for new containers reliable and commercially feasible. Thus, while using virgin bio-based resin for containers (whether conventional-type "up to 30%" bio-based containers or even 100% bio-based containers) is generally "eco-friendly," it could be more so with the incorporation of recycled bio-based materials.

Different combinations of plastic materials for the manufacture of plastic containers is envisioned and described in connection with the non-limiting examples identified in the table below.

| Example | Virgin Petrol-based | Virgin "up to 30% Bio-based" | Virgin 100% Bio-based | PCR Petrol-based | PCR "up to 30% Bio-based" | PCR 100% Bio-based | PCR Custom Blend Bio-based |
| --- | --- | --- | --- | --- | --- | --- | --- |
| 1 | 0% | 100% | 0% | 0% | 0% | 0% | 0% |
| 2 | 0% | 0% | 100% | 0% | 0% | 0% | 0% |
| 3 | 0% | 25% | 0% | 75% | 0% | 0% | 0% |
| 4 | 90% | 0% | 0% | 10% | 0% | 0% | 0% |
| 5 | 90% | 0% | 0% | 0% | 10% | 0% | 0% |
| 6 | 0% | 90% | 0% | 0% | 10% | 0% | 0% |
| 7 | 90% | 0% | 0% | 0% | 0% | 0% | 10% |

Example 1 might apply to a container such as that generally described in U.S. Patent Application Publication No. 2009/0246430, i.e., an "up to 30% bio-based container." Example 2 might apply to a container of the type proposed in U.S. Patent Application Publication No. 2010/0028512, which includes 100% bio-based virgin material. With each of the first two examples, there is no contemplation of any PCR content.

Example 3 is an example of an article having both bio-based material and PCR. In that example, 25% content by weight of the article is bio-MEG based PET (or "up to 30% bio-based content PET"), and 75% content by weight is PCR PET. The PCR content in this example has no bio-based provenance and may be considered standard, commodity or virgin PCR.

Example 4 involves aspects of the instant teachings, and envisions a container a bio-based plastic container that includes recycled bio-based materials. For some embodiments that involve the inclusion of recycled bio-based materials an element (e.g., a dye) may be included to mask or inhibit characteristics (such as "haze") that might be associated with the use of recycled content in connection with the article.

Example 6 involves aspects of the instant teachings, and envision a bio-based container that includes recycled bio-based materials. For example, a manufacturer's objective may be to provide an article that employs PCR content while maintaining the level of bio-based content that it might commonly employ when using virgin material. For example and without limitation, with Example 6 an article may have about 90% by weight virgin bio-based content. The particular bio-based content is "up to 30% bio-based," such as PET having its ethylene glycol (EG) component completely derived from bio-based sources. The example article would be able to maintain its 30% bio-based content despite adding PCR material since the manufacturer is able to source PCR material having substantially similar (or even equal or nearly equal) bio-based content as the virgin component. Maintaining such a bio-based equilibrium can be a significant objective or goal for some applications. One way, for example, for achieving a bio-based equilibrium is utilizing both virgin content and PCR content, even at different amounts by weight, with the virgin and PCR content each having substantially similar bio-based percentages. It is noted that the foregoing principles may be applied to articles having a wide range of bio-content percentages, including those with bio-based percentages ranging from above 0% to about 100%.

For some embodiments of a bio-based plastic article including PCR bio-based materials, the PCR bio-based material content may be up to 100% by weight of the un-filled container. However, a preferred embodiment may comprise PCR bio-based material at between about 1% and about 50% by weight and virgin material at between about 50% and about 99% by weight. More preferably, the PCR bio-based material would be present at from about 1% to about 20%, and the virgin material would be present from about 80% to about 99%. The virgin material may optionally be bio-based. Of the recycled bio-based material content, it may comprise, without limitation, one or more of the following: "up to 30% bio-based" PCR resin, 100% bio-based PCR resin, or a custom blend of PCR bio-based resins.

Embodiments of a PET bio-based container (with or without recycled bio-based materials) may, for example and without limitation, be provided in a monolayer configuration. Embodiments of bio-based containers (with or without recycled bio-based materials) may, for example and without limitation, be provided in a multi-layer configuration.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims and their equivalents.

What is claimed is:

1. A bio-based plastic container comprising recycled bio-based material, the bio-based plastic container comprising between about 1% and about 50% by weight of recycled bio-based material;
    wherein the bio-based plastic container is comprised of both recycled bio-based polyethylene terephthalate and petrol-based polyethylene terephthalate;
    wherein the bio-based plastic container includes an identifier that is part of the plastic or within the plastic; and
    wherein the identifier represents or discloses information that distinguishes between the content of recycled bio-based polyethylene terephthalate and the content of petrol-based polyethylene terephthalate comprising the bio-based plastic container.

2. The bio-based plastic container of claim 1, wherein the identifier represents or discloses a bio-based material percentage.

3. The bio-based plastic container of claim 1, wherein the identifier includes one or more additives, and the one or more additives distinguishing the bio-based plastic container from a petrol-based container.

4. The bio-based plastic container of claim 1, wherein the identifier comprises a colorant or dye.

5. The bio-based plastic container of claim 4, wherein the colorant or dye is included in resin forming the bio-based plastic container.

6. The bio-based plastic container of claim 1, wherein the identifier is not visible/perceptible to a human eye without special equipment.

7. The bio-based plastic container of claim 1, wherein the identifier represents or discloses a percentage of the bio-based plastic container that is comprised of a bio-based material.

8. The bio-based plastic container of claim 1, including a distinguishing or visible mark that designates the plastic container as bio-based.

9. The bio-based plastic container of claim 1, wherein the identifier comprises a marker.

10. The bio-based plastic container of claim 9, wherein the marker includes one of more of the following: UV dye, colorant, chemical trace, organic additive, tint.

11. The bio-based plastic container of claim 9, wherein the marker is a compound added to a resin forming the bio-based plastic container.

12. The bio-based plastic container of claim 1, wherein the identifier includes a tracer.

13. The bio-based plastic container of claim 12, wherein the tracer distinguishes resin produced by a manufacturer from similar resins produced by others.

14. The bio-based plastic container of claim 12, wherein the tracer is at a level in the single parts per billion or less.

15. The bio-based plastic container of claim 12, wherein the tracer is added during a melt polymerization phase or a solid state polymerization stage.

16. The bio-based plastic container of claim 12, wherein the tracer identifies bio-based containers for recovery within a recycling process.

17. The bio-based plastic container of claim 1, wherein the recycled bio-based material includes PCR bio-based material.

18. The bio-based plastic container of claim 17, wherein the PCR bio-based material is up to 100% of the total weight of the bio-based plastic container in an un-filled condition.

19. The bio-based plastic container of claim 17, wherein the PCR bio-based material comprises up to 30% bio-based PCR resin.

20. The bio-based plastic container of claim 17, wherein the PCR bio-based material comprises between about 1% and about 20% of the total weight of the bio-based plastic container in an un-filled condition.

21. The bio-based plastic container of claim 17, wherein the PCR bio-based material comprises between about 1% and about 20% of the total weight of the bio-based plastic container in an un-filled condition, a virgin material comprises about 80% to about 99% of the total weight of the container, and the virgin material is bio-based.

22. The bio-based plastic container of claim 17, wherein the recycled bio-based material comprises one or more of the following: up to 30% bio-based PCR resin, 100% bio-based PCR resin, and/or a custom blend of PCR bio-based resins.

23. The bio-based plastic container of claim 1, wherein the identifier comprises a colorant or dye that is included in resin forming the bio-based plastic container; the identifier is not visible/perceptible to a human eye without special equipment; the identifier represents or discloses a percentage of the bio-based plastic container that is comprised of a bio-based material; the recycled bio-based material includes PCR bio-based material; and the PCR bio-based material comprises up to 30% bio-based PCR resin.

* * * * *